US008695622B2

(12) United States Patent
Inglis et al.

(10) Patent No.: US 8,695,622 B2
(45) Date of Patent: Apr. 15, 2014

(54) BALL VALVE SAFETY PLUG

(75) Inventors: Peter Derek Walter Inglis, Dundee (GB); Katherine Ann Davies, Carnoustie (GB)

(73) Assignee: Halliburton Energy Services, Inc., Houston, TX (US)

( * ) Notice: Subject to any disclaimer, the term of this patent is extended or adjusted under 35 U.S.C. 154(b) by 500 days.

(21) Appl. No.: 13/089,088

(22) Filed: Apr. 18, 2011

(65) Prior Publication Data
US 2012/0260991 A1 Oct. 18, 2012

(51) Int. Cl.
*F16K 17/40* (2006.01)
*E21B 34/12* (2006.01)
*E21B 34/08* (2006.01)

(52) U.S. Cl.
USPC ............... 137/68.17; 137/68.23; 137/155; 137/797; 166/332.3; 166/332.4

(58) Field of Classification Search
CPC ............... F16K 17/406; F16K 5/0647; E21B 2034/002; E21B 23/14; E21B 34/12; E21B 43/123; E21B 34/063
USPC .......... 137/797, 155, 67, 68.11, 68.16, 68.17, 137/68.23, 68.19, 68.28; 166/332.3, 332.4
See application file for complete search history.

(56) References Cited

U.S. PATENT DOCUMENTS

| | | | | |
|---|---|---|---|---|
| 3,397,712 A | * | 8/1968 | Boroson | 137/68.27 |
| 4,703,807 A | | 11/1987 | Weston | |
| 6,152,229 A | | 11/2000 | Jennings | |
| 6,832,656 B2 | * | 12/2004 | Fournier et al. | 166/373 |

FOREIGN PATENT DOCUMENTS

| | | |
|---|---|---|
| KR | 200432793 Y1 | 12/2006 |
| WO | 2010025152 A1 | 3/2010 |
| WO | 2012143775 A2 | 10/2012 |
| WO | 2012143775 A3 | 10/2012 |

OTHER PUBLICATIONS

Halliburton Basic Design and Maintenance Instructions, "Halliburton HRF upside down flapper valve," Revision A, Jun. 5, 2009, pp. 1-12, Halliburton.
Halliburton brochure entitled "TF tubing tester flapper valve," Oct. 2010, 2 pages, Halliburton.
Foreign communication from a related counterpart application—International Search Report and Written Opinion, PCT/IB2012/000754, Nov. 1, 2012, 8 pages.

\* cited by examiner

*Primary Examiner* — Craig Schneider
(74) *Attorney, Agent, or Firm* — Scott Wendorf; Conley Rose, P.C.

(57) ABSTRACT

A ball within a ball valve comprises a ball, an interior fluid passage extending through the ball, a first flow passage disposed in the ball that allows fluid communication between an exterior fluid and the interior fluid passage, a second flow passage disposed in the ball that extends through a wall of the ball to the interior fluid passage, where the first flow passage and the second flow passage are on opposite hemispheres of the ball, and a flow through device. The flow through device comprises a plug disposed in the second flow passage and configured to sealingly engage the ball, and a shear device configured to engage the plug and retain the plug in the second flow passage.

20 Claims, 5 Drawing Sheets

BALL VALVE SAFETY PLUG

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Wellbores are sometimes drilled into subterranean formations containing hydrocarbons to allow recovery of the hydrocarbons. During the drilling and production of a hydrocarbon bearing formation, various procedures may be performed that involve temporarily isolating fluid flowing between the surface of a wellbore and the formation through a wellbore tubular. Such procedures can include flow control operations, completion operations, and/or interventions. Various valves, including ball valves, may be used during these procedures to control the flow of fluid through the wellbore tubular. Ball valves generally include a ball seat for receiving a sealing ball. In some situations, ball valves may fail during use, which may reduce the ability to establish fluid communication between the surface of the wellbore and the formation through the wellbore tubular.

SUMMARY

In an embodiment, a ball within a ball valve comprises a ball, an interior fluid passage extending through the ball, a first flow passage disposed in the ball that allows fluid communication between an exterior fluid and the interior fluid passage; a second flow passage disposed in the ball that extends through a wall of the ball to the interior fluid passage, wherein the first flow passage and the second flow passage are on opposite hemispheres of the ball; and a flow through device. The flow through device comprises a plug disposed in the second flow passage and configured to sealingly engage the ball, and a shear device configured to engage the plug and retain the plug in the second flow passage. The shear device may comprise a shear ring, and the shear device may comprise a shear pin or a shear screw. The ball may also include a shear device retainer coupled to the plug. A portion of the shear device may be disposed between the shear device retainer and the plug.

In an embodiment, a ball valve comprises a housing, a ball rotatably disposed within the housing, an interior fluid passage extending through the ball, a first flow passage disposed in the ball that allows fluid communication between an exterior fluid and the interior fluid passage, a second flow passage disposed in the ball that extends through a wall of the ball to the interior fluid passage; wherein the first flow passage and the second flow passage are on opposite hemispheres of the ball, and a flow through device. The flow through device comprises a plug configured to sealingly engage the ball when the plug is disposed in the first flow passage or the second flow passage, and a shear device configured to engage the plug and retain the plug in sealing engagement with the ball. The ball valve may also include a shear device retainer coupled to the plug. At least a portion of the plug may comprise an expanded cross section configured to prevent the plug from passing through the ball to the interior flow passage. The ball valve may also include a wellbore tubular coupled to the ball valve.

In an embodiment, a method comprises establishing fluid communication between a first location and a second location in a wellbore, wherein the first location is above the second location, isolating the fluid communication between the first location and the second location using a ball valve configured in a closed position, providing a force to the ball valve, and re-establishing fluid communication between the first location and the second location through the ball valve in the closed position. The closed position may comprise a fully closed position or a semi-closed position. Providing a force to the ball valve may comprise establishing a pressure above a threshold in the ball valve, and the threshold may be a pressure differential between the first location and the second location of about 10,000 psi. The ball valve may comprise a ball with a flow through device disposed in the ball. Re-establishing fluid communication may comprise activating the flow through device. The ball valve may comprise a ball rotatably disposed within a housing, and a flow through device in fluid communication with the first location. The flow through device may comprise a plug disposed in a flow passage in a wall of the ball and configured to sealingly engage the ball, and a shear device configured to engage the plug and retain the plug in sealing engagement with the ball. The flow through device may also include a shear device retainer coupled to the plug, wherein a portion of the shear device is disposed between the plug and the shear device retainer. Providing a force to the ball valve may comprise providing a pressure above a threshold, and re-establishing fluid communication between the first location and the second location may comprise shearing the shear device in response to the pressure above the threshold; and disengaging the plug from the flow passage in the wall of the ball. The method may also include providing a fluid to the second location after re-establishing fluid communication between the first location and the second location through the ball valve. The fluid may comprise a kill fluid. The ball valve may comprise a ball rotatably disposed within a housing; and a flow through device in fluid communication with the first location. The flow through device may comprise a plurality of plugs disposed in a corresponding plurality of flow passages in a wall of the ball, wherein each of the plurality of plugs is configured to sealingly engage the ball; and a corresponding plurality of shear devices configured to engage each of the plurality of plugs and retain the plugs in sealing engagement with the ball.

These and other features will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description.

DETAILED DESCRIPTION OF THE EMBODIMENTS

Figure 1:
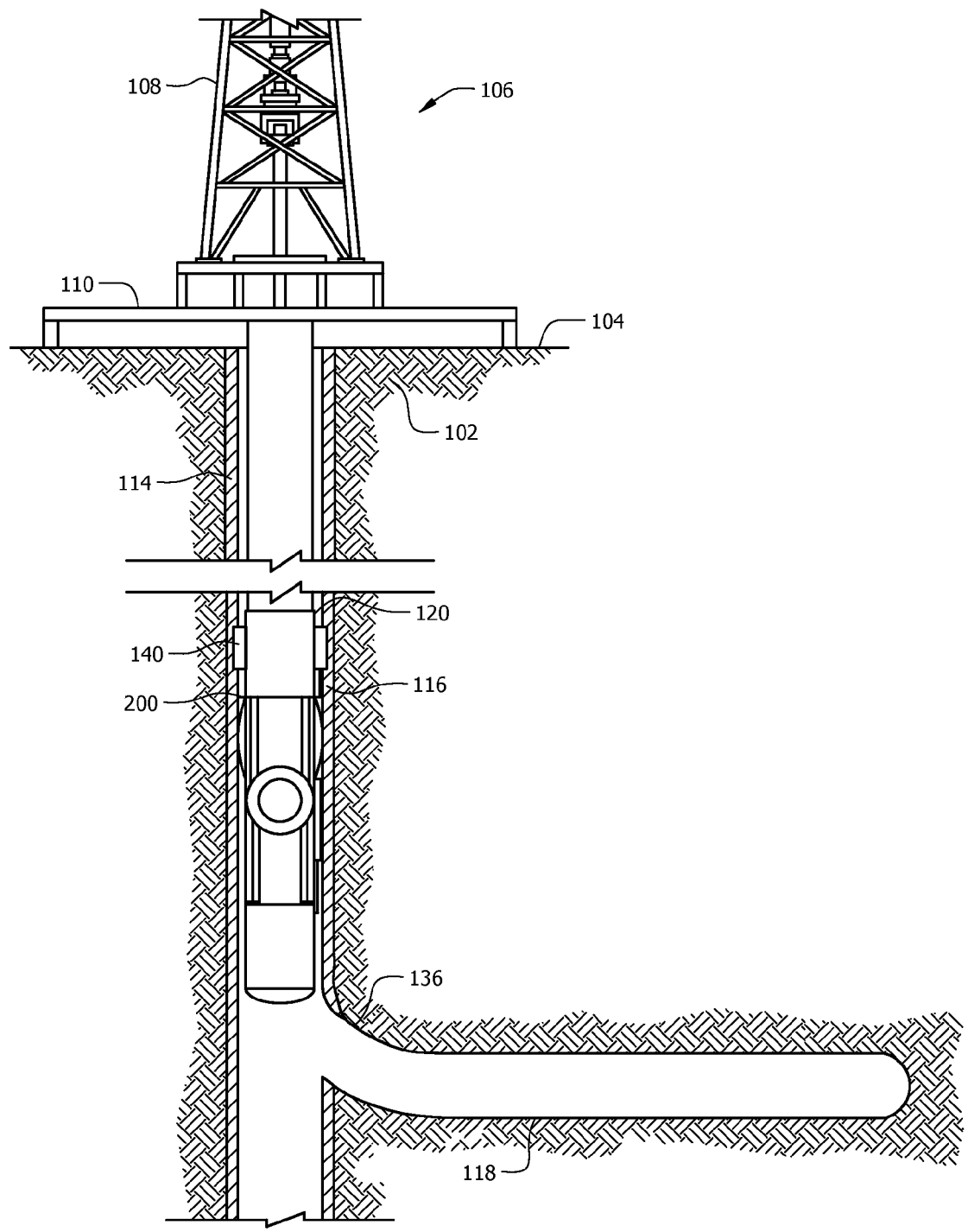
FIG. 1 is a schematic view of an embodiment of a subterranean formation and wellbore operating environment.

In the drawings and description that follow, like parts are typically marked throughout the specification and drawings with the same reference numerals, respectively. The drawing figures are not necessarily to scale. Certain features of the invention may be shown exaggerated in scale or in somewhat schematic form and some details of conventional elements may not be shown in the interest of clarity and conciseness.

Unless otherwise specified, any use of any form of the terms "connect," "engage," "couple," "attach," or any other term describing an interaction between elements is not meant to limit the interaction to direct interaction between the elements and may also include indirect interaction between the elements described. In the following discussion and in the claims, the terms "including" and "comprising" are used in an open-ended fashion, and thus should be interpreted to mean "including, but not limited to . . . ". Reference to up or down will be made for purposes of description with "up," "upper," "upward," or "above" meaning toward the surface of the wellbore and with "down," "lower," "downward," or "below" meaning toward the terminal end of the well, regardless of the wellbore orientation. The various characteristics mentioned above, as well as other features and characteristics described in more detail below, will be readily apparent to those skilled in the art with the aid of this disclosure upon reading the following detailed description of the embodiments, and by referring to the accompanying drawings.

Referring to FIG. 1, an example of a wellbore operating environment in which a ball valve 200 may be used is shown. As depicted, the operating environment comprises a workover and/or drilling rig 106 that is positioned on the earth's surface 104 and extends over and around a wellbore 114 that penetrates a subterranean formation 102 for the purpose of recovering hydrocarbons. The wellbore 114 may be drilled into the subterranean formation 102 using any suitable drilling technique. The wellbore 114 extends substantially vertically away from the earth's surface 104 over a vertical wellbore portion 116, deviates from vertical relative to the earth's surface 104 over a deviated wellbore portion 136, and transitions to a horizontal wellbore portion 118. In alternative operating environments, all or portions of a wellbore may be vertical, deviated at any suitable angle, horizontal, and/or curved. The wellbore may be a new wellbore, an existing wellbore, a straight wellbore, an extended reach wellbore, a sidetracked wellbore, a multi-lateral wellbore, and other types of wellbores for drilling and completing one or more production zones. Further the wellbore may be used for both producing wells and injection wells.

A wellbore tubular string 120 comprising a ball valve 200 may be lowered into the subterranean formation 102 for a variety of purposes (e.g., injecting or producing fluids from the wellbore, workover or treatment procedures, etc.) throughout the life of the wellbore 114. The embodiment shown in FIG. 1 illustrates the wellbore tubular 120 in the form of a production tubing string comprising a packer 140 disposed in the wellbore 114. It should be understood that the wellbore tubular 120 comprising the ball valve 200 is equally applicable to any type of wellbore tubular being inserted into a wellbore as part of a procedure needing fluid isolation from above or below the ball valve, including as non-limiting examples drill pipe, segmented pipe, casing, rod strings, and coiled tubing. Further, a means of isolating the interior of the wellbore tubular string 120 from the annular region between the wellbore tubular string 120 and the wellbore wall 114 may take various forms. For example, a zonal isolation device such as a packer (e.g., packer 140), may be used to isolate the interior of the wellbore tubular string 120 from the annular region to allow for the ball valve 200 to control the flow of a fluid through the wellbore tubular 120. In some embodiments, the wellbore tubular string 120 comprising the ball valve 200 may be used without any additional zonal isolation device (e.g., a packer).

The workover and/or drilling rig 106 may comprise a derrick 108 with a rig floor 110 through which the wellbore tubular 120 extends downward from the drilling rig 106 into the wellbore 114. The workover and/or drilling rig 106 may comprise a motor driven winch and other associated equipment for extending the wellbore tubular 120 into the wellbore 114 to position the wellbore tubular 120 at a selected depth. While the operating environment depicted in FIG. 1 refers to a stationary workover and/or drilling rig 106 for conveying the wellbore tubular 120 comprising the ball valve 200 within a land-based wellbore 114, in alternative embodiments, mobile workover rigs, wellbore servicing units (such as coiled tubing units), and the like may be used to lower the wellbore tubular 120 comprising the ball valve 200 into the wellbore 114. It should be understood that a wellbore tubular 120 comprising the ball valve 200 may alternatively be used in other operational environments, such as within an offshore wellbore operational environment.

Regardless of the type of operational environment in which the ball valve 200 is used, it will be appreciated that the ball valve 200 comprising a flow through device serves to control the flow of fluid from the surface of a wellbore to a formation (and vice-versa) through a tubular or conduit, including situations in which the ball valve 200 fails to actuate. As described in greater detail with reference to FIG. 2, the ball valve 200 comprises a ball 206 that can be disposed between two retaining members 202, 204 and an actuation member 208 that can actuate the ball between an open and closed position and/or a closed and open position. The ball 206 comprises a flow through device that can be actuated if the ball valve 200 fails in a closed position in order to establish fluid communication through the ball valve 200. The ball valve 200 may also comprise components (e.g., a threaded connection) located above or below the ball valve 200 to allow the ball valve 200 to be disposed within and/or coupled to a wellbore tubular and/or other wellbore components (e.g., production subs, downhole tools, screens, etc.), for example to form a workstring, production string, conveyance string, etc. While the following discussion describes a wellbore tubular 120 with a ball valve 200, it should be understood that any plurality of ball valves 200 comprising the flow through device may be used in one or more wellbore tubular 120 strings to achieve the results and advantages described herein.

Figure 2:
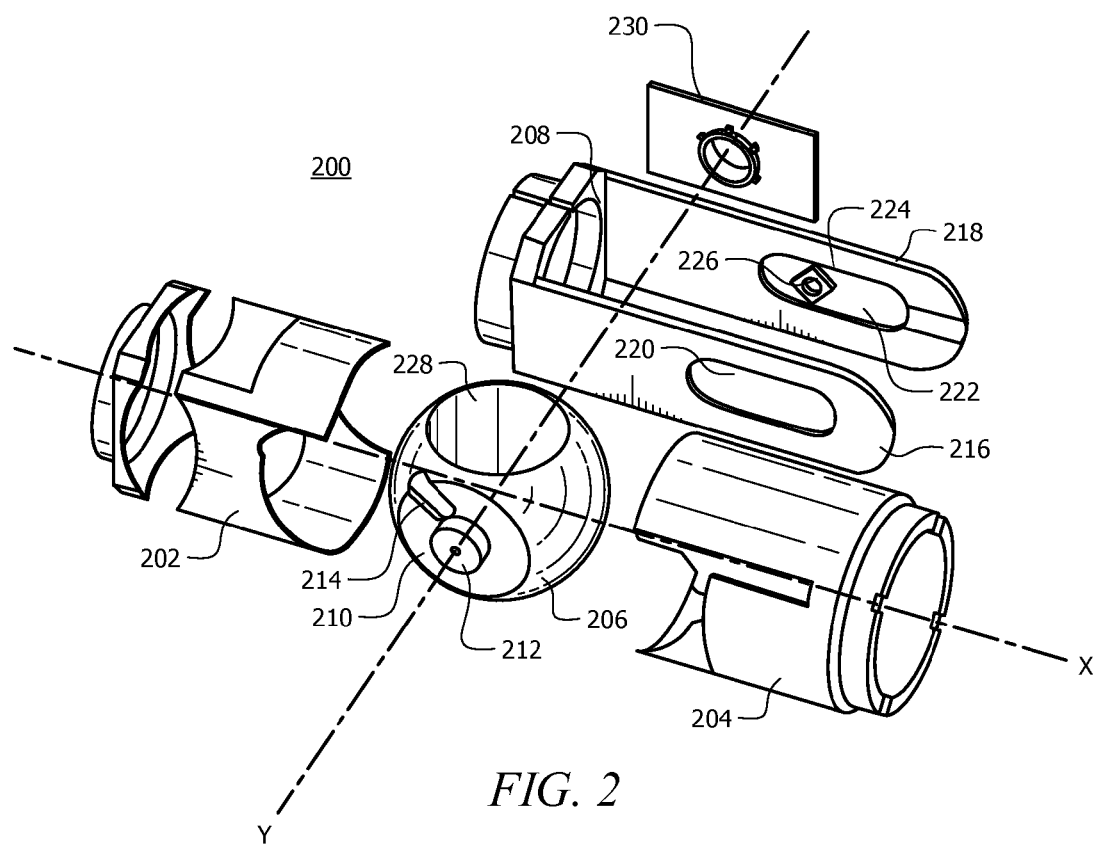
FIG. 2 is an isometric view of an embodiment of a ball valve.

As shown in FIG. 2, the ball valve 200 may generally comprise a variety of components to provide a seal (e.g., a ball/seat interface) and actuate the ball valve 200. While an exemplary ball valve assembly is described herein, it is expressly understood that the ball comprising the flow device described herein may be used in any ball valve and is not limited to the ball valve assembly described herein. The ball valve 200 assembly may comprise two cylindrical retaining members 202, 204 on opposite sides of the ball 206. One or more seats or seating surfaces may be disposed above and/or below the ball 206 (e.g., within or engaging cylindrical retaining member 202 and/or cylindrical retaining member 204) to provide a fluid seal with the ball 206. The ball 206 comprises a truncated sphere having planar surfaces 210 on opposite sides of the sphere. Planar surfaces 210 may each have a projection 212 (e.g., cylindrical projections) extending outwardly therefrom, and a radial groove 214 extending from the projection 212 to the edge of the planar surface 210.

An actuation member 208 having two parallel arms 216, 218 may be positioned about the ball 206 and the retaining members 202, 204. The actuation member 208 may be aligned such that arms 216, 218 are in a plane parallel to that of planar surfaces 210. Projections 212 may be received in windows 220, 222 through each of the arms 216, 218. Actuation pins 224 may be provided on each of the inner sides of the arms 216, 218. Pins 224 may be received within the grooves 214 on the ball 206. Bearings 226 may be positioned between each pin 224 and groove 214, and a housing member 230 may engage a projection 212 within the respective windows 220, 222.

In the open position, the ball 206 is positioned so as to allow flow of fluid through the ball valve 200 by allowing fluid to flow through an interior fluid passageway 228 (e.g., a bore or hole) extending through the ball 206. During operation, the ball 206 is rotated about rotational axis Y such that interior flow passage 228 is rotated out of alignment with the flow of fluid, thereby forming a fluid seal with one or more seats or seating surfaces and closing the valve. The interior flow passage 228 may have its longitudinal axis disposed at about 90 degrees to the axis X when the ball is in the closed position and the longitudinal axis may be aligned with the axis X when the ball is in the open position. The ball 206 may be rotated by linear movement of the actuation member 208 along axis X. The pins 224 move as the actuation member 208 moves, which causes the ball 206 to rotate due to the positioning of the pins 224 within the grooves 214 on the ball 206.

The ball 206 may comprise a flow through device that allows for fluid communication through the ball valve 200 when the ball valve 200 is in the closed position. For example, the flow through device may be used to establish fluid communication through the ball valve 200 when the actuation member 208 fails to open the ball valve 200. In an embodiment, the flow through device may comprise a plug 306 that is disengaged when a force is applied to the shear device 308 above a threshold. In an embodiment, the flow through device may comprise a plurality of plugs 306, each of which may be disengaged when a force is applied to the shear device above a threshold. As described in more detail below with reference to FIG. 3, the shear device 308 may fail at a pressure threshold, disengaging and releasing the plug 306 into the wellbore to allow fluid to flow through the ball valve 200. The flow through device may be used to establish fluid communication between an upper portion of a wellbore, which may include equipment on the surface, and the wellbore tubular and/or the formation of interest using a fluid pressurized above a threshold. This may quickly and safely establish fluid flow through the ball valve 200 without the need to use a downhole tool or mill the ball valve 200.

Figure 3:
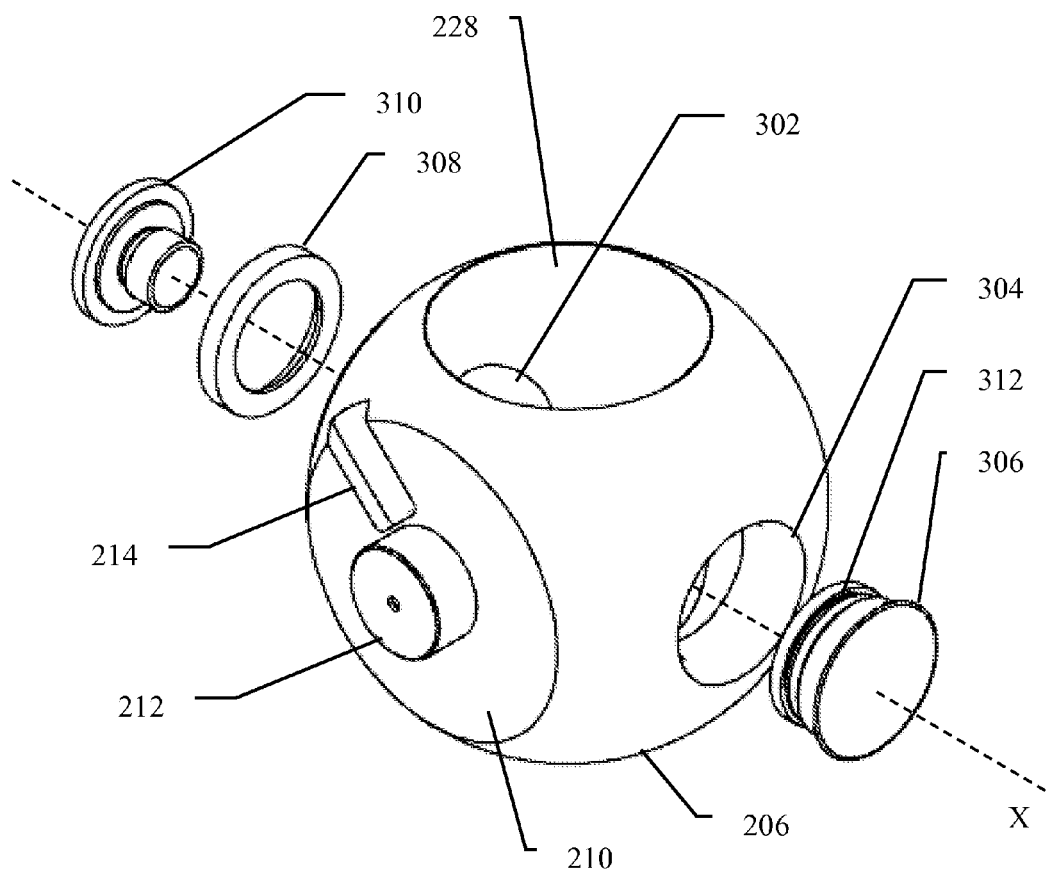
FIG. 3 is an isometric view of an embodiment of a ball according to the present disclosure.

FIG. 3 illustrates an embodiment of a ball 206 comprising a flow through device comprising a plug 306 disposed in a flow passage 304 extending through the wall of the ball 206 into the interior flow passage 228. On the opposite side of the ball and generally in line (e.g., coaxial along axis X) with flow passage 304, a flow passage 302 may also be disposed in the ball 206 to allow for fluid communication with the plug 306. The flow passages 302 and 304 form a discontinuous bore that intersects with the interior flow passage 228 of the ball. The flow passage 302 is disposed in the wall of the ball 206 to establish fluid communication between the interior flow passage 228 and a fluid above the ball valve 200 when the ball valve 200 is in a closed position (e.g., when the longitudinal axis of the interior flow passage 228 is at or about 90 degrees from the axis X). Flow passage 302 may have a generally cylindrical inner surface. In an embodiment, flow passage 302 may comprise a plurality of fluid passageways configured to allow for fluid communication with the plug 306. Flow passage 304 is disposed in the wall of the ball 206 on the opposite hemisphere of the ball 206 from the flow passage 302 to allow the plug 306 to disengage from the ball 206 when the ball valve 200 is in a closed position upon activation of the flow through device. Opposite hemispheres of the ball 206 may be defined by a plane extending along axis Y of FIG. 2. When the ball valve 200 is in a closed position, one or more seals may be formed between the ball 206 and one or more seats and/or seating surfaces below the ball 206. In an embodiment, the flow passage 304 may be disposed out of alignment with the axis X while still allowing for the formation of a seal between the ball 206 and the retaining member 204 and/or a sealing surface.

As shown in FIG. 4, the flow passage 304 may comprise a first portion 410 with a generally cylindrical inner surface, a second portion 412 with a generally cylindrical inner surface, and a third portion 414 with a generally cylindrical inner surface. The cross-section of the first portion 410 may be larger than that of the second portion 412, forming a shoulder 416 at the transition between the first portion 410 and the second portion 412. The cross-section of the second portion 412 and the third portion 414 may be about the same at the transition between the second portion 412 and the third portion 414. In an embodiment, the cross-section of the third portion 414 may increase from the transition between the second portion 412 and the third portion 414 to the outer surface of the ball 206. In an embodiment, the increase in the cross-section of the third portion 414 may be gradual, for example forming a frusto-conical cross section or curved section over the length of the third portion 414. In an embodiment, the increase in the cross-section of the third portion 414 may be abrupt, for example forming a shoulder near the outer surface of the ball 206 configured to prevent movement of the plug 306 towards the center of the ball 206.

In an embodiment, the plug 306 may have a generally cylindrical outer surface 404. A portion of the outer surface of the plug 306 near the outer surface of the ball 206 may have an expanded cross section that may be matched to the cross section of the third portion 414 of the inner surface of flow passage 304. The expanded cross section of the ball 206 may create a wedge effect and prevent the passage of the plug through the flow passage 304 upon the application of a pressure differential acting from beneath the ball 206 when the ball valve 200 is in a closed position (e.g., when fluid pressure is applied to the surface or face of plug 306, for example pressure from a formation fluid). In addition to preventing the passage of the plug 306 through the flow passage 304 into the interior flow passage 228, the wedge effect may act to resist the pressure force generated by the ball/seat interface and serve to make the ball 206 more resistant to movement when the pressure is applied from below the ball 206 (e.g., pressure from an isolated zone located below the ball valve 200), which represents an advantage of the ball valve 200 comprising the flow through device. The outer surface of the plug 306 may comprise one or more recesses such as recess 420 configured to receive one or more sealing elements 312 for providing a sealing engagement between the plug 306 and the ball 206. In an embodiment, the one or more sealing elements 312 may comprise T-seals, O-rings, or any other type of sealing elements, which may comprise elastomeric materials to aid in the formation of a seal. In an embodiment, the plug 306 may comprise a generally cylindrical inner surface 402 configured to engage the shear device retainer 310. One or more recesses and/or upsets may be disposed on the inner surface 402 of the plug 306 to enable the coupling of the plug 306 to the shear device retainer 310.

The plug 306 may be disposed in the flow passage 304 and maintained in position using a shear device 308 and a shear device retainer 310, as shown by the cross section of the ball 206 and plug 306 in FIG. 4. In an embodiment, the shear device retainer 310 has a T-shaped cross-section. The shear device retainer 310 may comprise a first portion 406 with a generally cylindrical outer surface and a second portion 408 with a generally cylindrical outer surface. The cross-section of the first portion 406 may be larger than that of the second portion 408, thereby forming a shoulder 422 in the shear device retainer 310 at the transition between the first portion 406 and the second portion 408. The second portion 408 of the shear device retainer 310 may comprise one or more recesses and/or upsets for engaging corresponding upsets and/or recesses on the inner surface 402 of the plug 306. The shear device retainer 310 may engage and be coupled to the plug 306 so that the shoulder 422 engages the end of the plug 306, and at least a portion of the shear device 308 may be disposed between the shoulder 422 of the shear device retainer 310 and the plug 306. In an embodiment, the shear device 308 is a shear ring (e.g., a cylindrical ring of material having a hole or bore therein). Additional shear devices may include shear screws, shear pins, or the like as described in more detail herein.

The shear device 308 may comprise an outer surface configured to engage the first portion 410 of the flow passage. The outer diameter of the shear device may be greater than the inner diameter of the second portion 412 of the flow passage 304 so that the shear device engages the shoulder 416. The shear device 308 may comprise an inner upset 418 disposed between the first portion 406 and the second portion 408 of the shear device retainer 310 and the plug 306. The upset 418 may be configured to maintain the plug 306 and the shear device retainer 310 in position until activation of the flow through device. When the plug 306 and the shear device retainer 310 are maintained in position in the flow passage 304, the one or more sealing elements 312 may prevent the flow of fluid in response to a pressure differential across the ball 306. As a result, a ball 206 configured according to the present disclosure may be capable of maintaining a fluid seal while withstanding a pressure differential across the ball valve 200 applied from above or below the ball 206.

Figure 5:
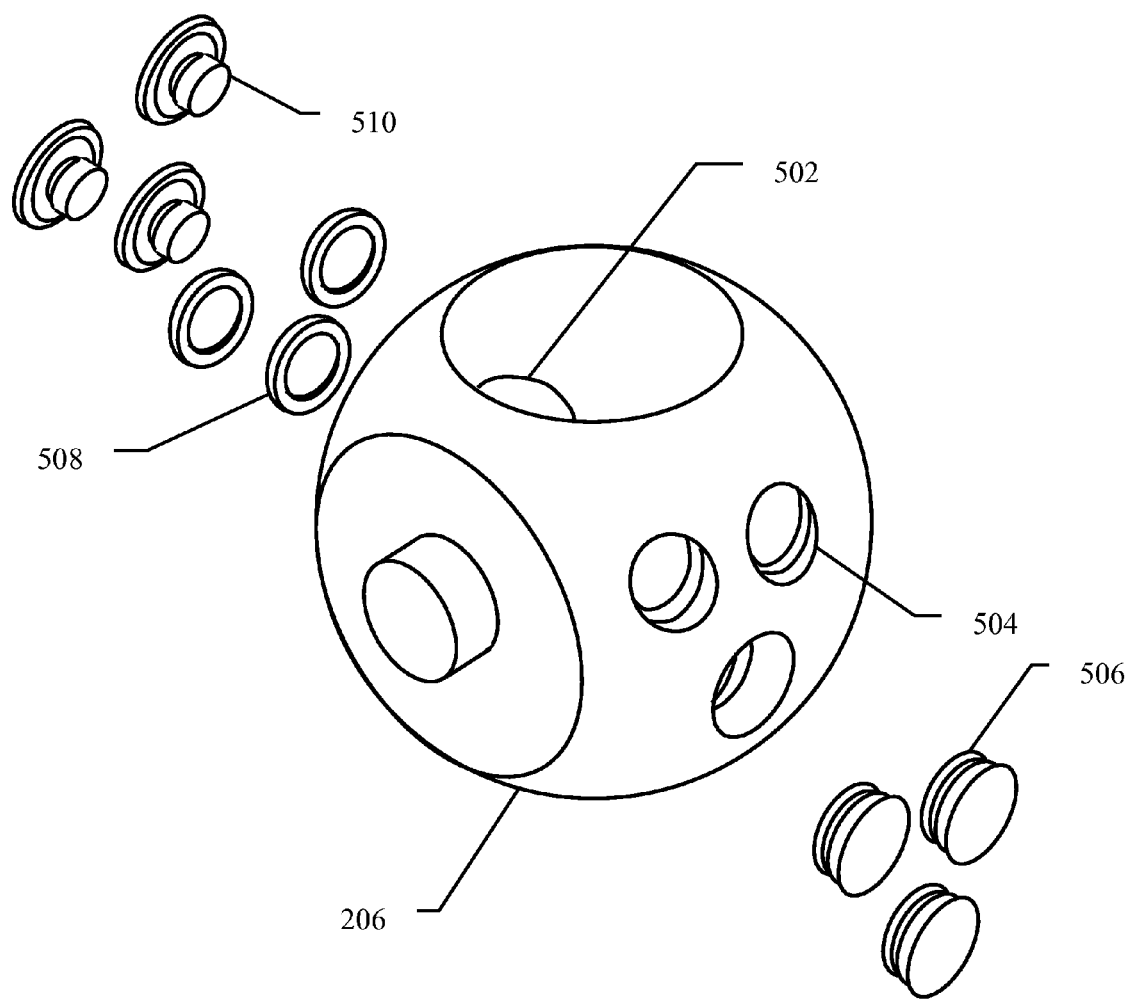
FIG. 5 is an isometric view of another embodiment of a ball according to the present disclosure.

In an embodiment as shown in FIG. 5, the flow through device may comprise a plurality of plugs 506, each of which may be disengaged when a force is applied to the shear device 508 above a threshold. A plurality of fluid passages 504 may each contain a plug 506, which may be engaged to a shear device 508 and shear device retainer 510. In an embodiment, the ball 206 may also comprise a plurality of flow passages 502 (e.g., a series of small fluid passageways). Each plug 506 forming the flow through device may be configured to disengage from the respective flow path 504 upon the application of a force, which may be the same or different for each shear device 508. While FIG. 5 illustrates three plugs 506 and corresponding flow passages 504, it is expressly envisioned that the flow through device can comprise two or more plugs disposed in a corresponding number of flow passages. The use of a flow through device comprising a plurality of flow passages 504 may provide some redundancy in the flow through device, which may ensure proper operation of the flow through device in an emergency situation.

The shear device 308 may fail in response to a force that exceeds a threshold, allowing the shear device retainer 310 and the plug 306 to disengage and pass out of the flow passage 304, thereby allowing fluid to pass through the ball 206 when the ball valve 200 is in a closed position. As used herein, the term "fail" includes both shearing of the shear device and any other mechanism by which the shear device may be activated to allow the shear device retainer 310 and the plug 306 to be disengaged from the flow passage 304. For example, the term "fail" may include, at least in part, a sufficient deformation or displacement of the shear device 308 to allow for the plug 306 to be disengaged from (e.g., to be released from or out of) the flow passage 304. In an embodiment, the shear device 308 may comprise a shear ring that extends around the entire perimeter of the flow passage 304. In an embodiment, the shear device 308 may comprise one or more shear pins and/or shear screws maintained in position in one or more slots and/or threaded receptacles in the perimeter of flow passage 304, for example engaging shoulder 416. In this embodiment, the plug 306 and the shear device retainer 310 may comprise an integral component that may be disposed in the flow passage 304 followed by insertion of the shear pins and/or shear screws.

The shear device 308 may be configured to fail at a threshold. In an embodiment, the shear device 308 may be configured to fail when the fluid pressure in flow passage 228 as supplied through flow passage 302 exceeds a pressure threshold. In an embodiment, the pressure threshold may range from about 1,000 psi to about 30,000 psi, alternatively from about 5,000 psi to about 25,000 psi, alternatively from about 10,000 psi to about 20,000 psi, depending on the type of service in which the ball valve 200 is placed and the operating conditions (e.g., temperature, pressure, fluid chemistry, etc.) in which the ball valve 200 is used. In an embodiment, the pressure threshold may be above the rated operating pressure of the ball valve 200. In an embodiment, the rated operating pressure of the ball valve may be measured by a pressure differential across the ball valve 200 (e.g., as measured from above to below, or below to above), and the pressure differential may be about 10,000 psi, alternatively about 15,000 psi, or alternatively about 20,000 psi. In an embodiment, the pressure threshold may be below the maximum operating pressure of the ball valve 200, which may represent the pressure differential at which the ball valve components fail due to mechanical stress, fracturing, and/or deformations. In an embodiment, the maximum operating pressure of the ball valve 200 may be about 15,000 psi, alternatively about 20,000 psi, or alternatively about 25,000 psi.

The plug 306, the shear device 308, and/or the shear device retainer 310 may be configured such that all or a portion of each may disengage or pass through the flow passage 304 upon the activation of the flow through device, thereby opening flow passage 304 to fluid flow. The shear device 308 may be configured to fail so that the portion of the shear device 308 passing out of the flow passage 304 (e.g., sheared inner upsets 418) may have a diameter less than the smallest interior diameter of the flow passage 304. A portion of the shear device 308 may remain in the flow passage 304 upon the activation of the flow through device and may be removed from the ball 206 upon retrieval of the ball valve 200 to the surface. The outer diameter of the first portion 406 of the shear device retainer 310 may be less than the smallest interior diameter of the flow passage 304, thereby allowing the shear device retainer to pass out of the flow passage 304. In an embodiment, the diameter of the inner surface of the second portion 412 of the flow passage 304 may represent the smallest interior diameter through which the shear device retainer 310 and a portion of the shear device 308 may pass through and/or out of.

As shown in FIG. 3, the ball valve 200 comprising the flow through device may be constructed by disposing the shear device 308 within the flow passage 304 followed by disposing the shear device retainer 310 into the flow passage 304 through the interior flow passage 228 and/or flow passage 302. The plug 306 comprising the one or more sealing elements 312 disposed in the recess 420 may then be disposed in the flow passage 304 from the outside of the ball 206 and pressure may be applied to the plug 306 and the shear device retainer 310 to couple the shear device retainer 310 to the plug 306 with at least a portion of the shear device 308 disposed therebetween to retain the shear device retainer 310 and the plug 306 in the flow passage 304. The ball 206 may then be disposed in the ball valve 200 according to the design of the specific ball valve. In an embodiment in which the shear device 308 comprises shear pins and/or shear screws, the plug 306 and the shear device retainer 310 may comprise a single, integral piece. In this embodiment, the single piece plug may be disposed in the flow passage 304 from the exterior of the ball 206 and one or more shear pins and/or shear screws (e.g., shear pins and/or shear screws 450 shown in FIG. 4B) may be engaged with the ball and the single piece plug to retain the single piece plug in the flow passage 304. For example, the shear pins and/or shear screws may be inserted through one or more holes extending from the interior flow passage 228 through the ball 206 and aligning with corresponding holes in the single piece plug. The single piece plug may then be retained in the flow passage 304 until being disengaged upon activation of the flow through device.

Referring to FIGS. 1-4, the ball valve 200 comprising the flow through device may be used to control the flow of a fluid in a subterranean wellbore 114. In an embodiment, a ball valve 200 comprising the flow through device as described herein may be provided and disposed within the wellbore 114 in a subterranean formation 102. The ball valve 200 may form a part of a wellbore tubular string 120 and may be conveyed into and/or out of the wellbore 114 as part of the wellbore tubular string 120. Additional wellbore components such as one or more zonal isolation devices 140 may be used in conjunction with the ball valve 200 comprising the flow through device to control the flow of a fluid within the wellbore 114. In some embodiments, one or more ball valves 200 comprising the flow through device may be used with a wellbore tubular string 120 to control the flow of fluids within various zones of wellbore 114. The use of the ball valve 200 comprising the flow through device may allow for control of the flow of a fluid into or out of the wellbore.

Once disposed in the wellbore, the ball valve may be disposed in a closed position, or at any orientation between a closed position and an open position that does not provide for a suitable fluid communication rate through the ball valve 200 though still allows for the plug to be disengaged from the ball 206, which may be referred to hereinafter as a "semi-closed" position. In an embodiment, the ball valve 200 may be in a closed position or a semi-closed position due to the failure of the ball valve 200 to actuate from a closed position to an open position. Numerous conditions may result in the failure of the ball valve 200 to actuate from a closed or semi-closed position to an open position including, but not limited to, the presence of particulate matter or debris in the valve, erosion of the seals or activation mechanism, and/or failure of the activation mechanism components. In an embodiment, the ball valve 200 may be in a closed position and the flow through device may be activated without first attempting to actuate the ball valve 200. Activation of the flow through device without first attempting to actuate the ball valve may be useful in an emergency situation.

The flow through device may then be activated to establish fluid communication through the ball valve 200. When the ball 206 is in the closed position in the ball valve 200, the flow passage 302 may provide fluid communication to the interior flow passage 228 of the ball 206. An increased pressure within the interior flow passage 228 may then apply a pressure on the flow through device at the one or more sealing elements 312 disposed between the plug 306 and the flow passage 304. The sealing elements 312 may act as a piston in response to the application of the pressure in the interior flow passage 228. The pressure may act upon the area defined by the seal between the one or more sealing elements 312 and the flow passage 304 and provide a force on the shear device retainer 310, the shear device 308, and the plug 306. The flow through device may be activated by providing a force above a threshold to cause the shear device 308 to fail. In an embodiment, the pressure in the interior flow passage 228 may be increased (e.g., by increasing the pumping pressure of a fluid pumped into the wellbore tubular string via pumps located at the surface) above a threshold to provide a force sufficient to cause the shear device 308 to fail. In an embodiment, a direct physical force may be applied to the shear device retainer 310 in a downward direction using for example, a downhole tool and/or a tubing string passing through the flow passage 302 in order to provide a force sufficient to cause the shear device 308 to fail.

Upon failure of the shear device 308, the shear device retainer 310, the plug 306, and/or a portion of the shear device 308 may disengage from the ball 206 and pass through and/or out of the flow passage 304, leaving the flow passage 304 in fluid communication with the interior flow passage 228. Fluid communication may then be established through the flow passage 302, the interior flow passage 228, and flow passage 304, allowing for fluid communication through the ball valve 200. In an embodiment, the resulting fluid communication through the ball valve 200 may allow for fluid communication between a location above the ball valve 200 and a location below the ball valve 200. In an embodiment, the resulting fluid communication through the ball valve 200 may allow for fluid communication between a location above the ball valve 200 and the formation. In an embodiment, the resulting fluid communication through the ball valve 200 may allow for fluid communication between the surface and/or any equipment located on the surface and the formation.

The resulting fluid communication may be used to provide one or more fluids to the wellbore and/or the formation through the ball valve 200. For example, one or more treatment fluids may be provided to the wellbore and/or the formation below the ball valve. In an embodiment, one or more kill fluids may be provided to the wellbore and/or the formation below the ball valve 200. In an embodiment, suitable kill fluids may include, but are not limited to, muds, weighted muds, brines, weighted brines, cements, and any combination thereof. In an embodiment, one or more fluids comprising cementitious materials may be provided through the ball valve to isolate and/or plug the wellbore and/or the formation. In an embodiment, the fluid communication may be used to provide a pressurized fluid to a ball valve 200 comprising a flow through device located below the ball valve 200 comprising the activated flow through device.

In an embodiment, the ball valve 200 may be retrieved to the surface for replacement of the flow through device. The shear device retainer 310, a portion of the shear device 308, and the plug 306 may be retrieved from the wellbore or they may remain within the wellbore. The ball valve 200 may be disassembled sufficiently to provide access to the ball 206. The shear device retainer 310 or a new shear device retainer 310, a new shear device, and the plug 306 or a new plug 306 may then be replaced in the ball 206, allowing the ball valve 200 to be reused within the wellbore.

Figure 4A:
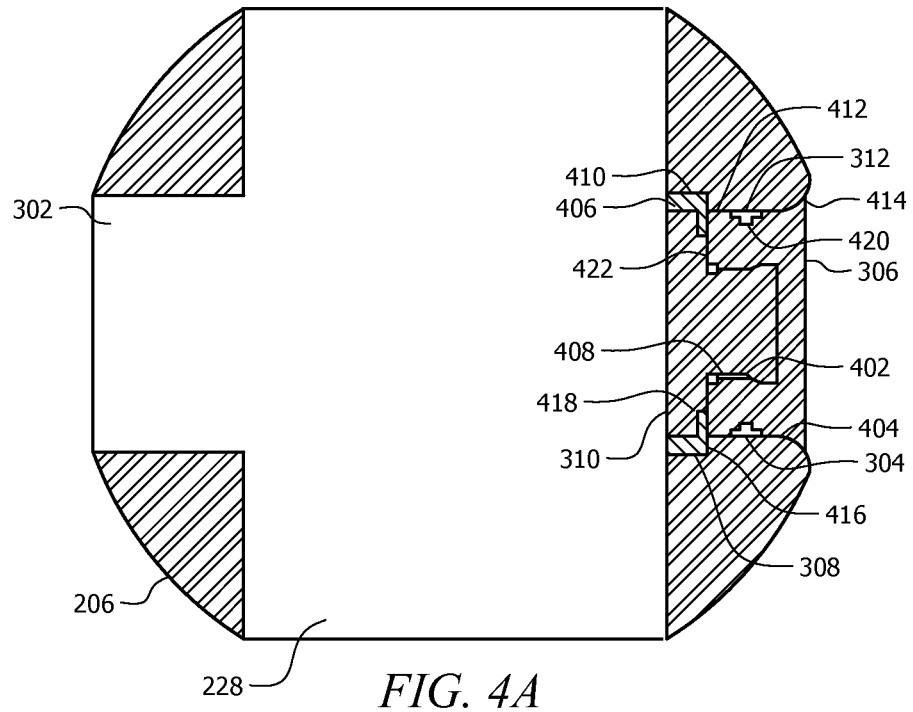
FIGS. 4A and 4B are schematic cross sectional views of embodiments of a ball according to the present disclosure.
Figure 4B:
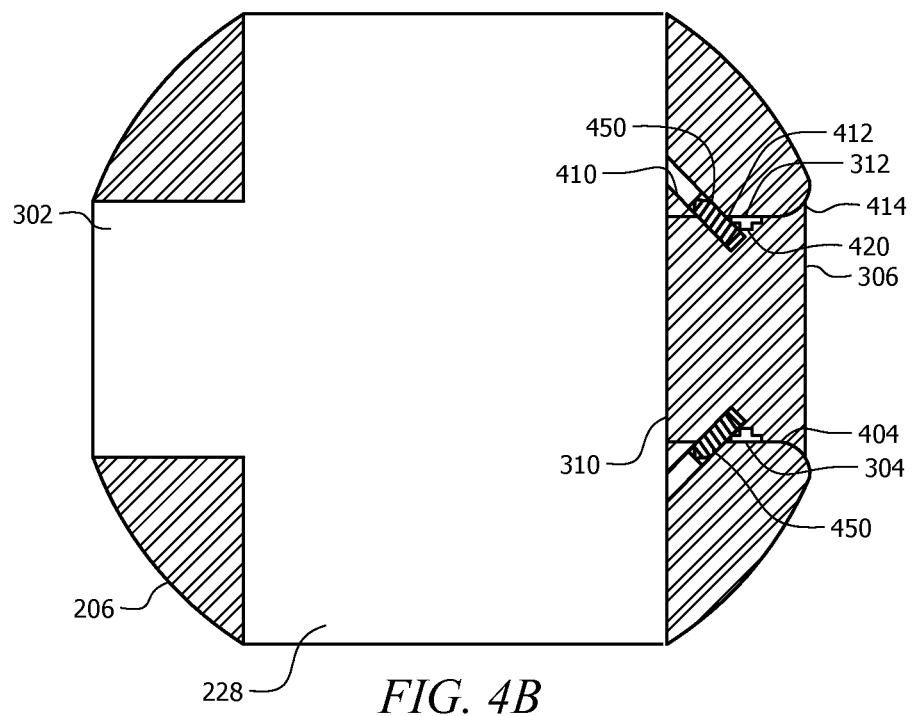

While the ball valve 200 comprising the flow through device is depicted in FIG. 3, FIG. 4A, and FIG. 4B with the shear device retainer 310, the shear device 308, and the plug 306 being located in the flow passage 304 on the lower portion of the ball 206, it is expressly envisioned that the shear device retainer 310, the shear device 308, and the plug 306 may be located in the flow passage 302 located on the upper portion of the ball 206. In this embodiment, the flow passage 304 may be configured with an interior diameter sufficient to allow the shear device retainer 310, a portion of the shear device 308, and the plug 306 to pass out of the flow passage 302 and through the flow passage 304 upon activation of the flow through device. Further, while the ball valve 200 comprising the flow through device is described in the context of a subterranean wellbore, it should be understood that the ball valve 200 comprising the flow through device of the present disclosure may be used in any industry or use in which it is desirable to establish the flow of fluid through the ball valve 200 when the ball valve 200 is disposed in a closed or semi-closed position.

The use of the flow through device as described herein may provide a safety feature to allow access to a wellbore and/or formation in the event that the ball valve comprising the flow through device fails to open. In some instances, the flow through device may allow fluids to be provided to a formation to kill the well without the need to mill through the ball, which may take extended periods of time and result in expensive workover procedures. For example, the flow through device may be used to provide fluid communication with the wellbore below the ball valve in emergency situations where fluid communication through the ball valve is needed in order to safely relieve trapped pressure in the tubing string and/or kill the well.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. A method comprising:
    establishing fluid communication between a first location and a second location in a wellbore, wherein the first location is above the second location;
    isolating the fluid communication between the first location and the second location using a ball valve configured in a closed position, wherein the ball valve comprises:
        a ball rotatably disposed within a housing; and
        a flow through device in fluid communication with the first location, wherein the flow through device comprises:
            a plug disposed in a flow passage in a wall of the ball and configured to sealingly engage the ball; and
            a shear device configured to engage the plug and retain the plug in sealing engagement with the ball;
    providing a force to the ball valve; and
    re-establishing fluid communication between the first location and the second location through the ball valve in the closed position.

2. The method of claim 1, wherein the closed position comprises a fully closed position or a semi-closed position.

3. The method of claim 1, wherein re-establishing fluid communication comprises activating the flow through device.

4. The method of claim 1 wherein the flow through device further comprises a shear device retainer coupled to the plug, wherein a portion of the shear device is disposed between the plug and the shear device retainer.

5. The method of claim 1, wherein providing a force to the ball valve comprises providing a pressure above a threshold, and wherein re-establishing fluid communication between the first location and the second location comprises:
    shearing the shear device in response to the pressure above the threshold; and
    disengaging the plug from the flow passage in the wall of the ball.

6. The method of claim 1,
    wherein the flow through device further comprises:
        a plurality of plugs disposed in a corresponding plurality of flow passages in the wall of the ball, wherein each of the plurality of plugs is configured to sealingly engage the ball; and
        a corresponding plurality of shear devices configured to engage each of the plurality of plugs and retain the plugs in sealing engagement with the ball.

7. The method of claim 1, wherein providing a force to the ball valve comprises increasing the pressure within an interior flow passage within the ball valve, and wherein re-establishing fluid communication between the first location and the second location through the ball valve in the closed position comprises: causing the shear device to fail based on the increased pressure within the interior flow passage.

8. The method of claim 1, wherein providing a force to the ball valve comprises applying a downward directed physical force to the shear device, and wherein re-establishing fluid communication between the first location and the second location through the ball valve in the closed position comprises: causing the shear device to fail based on the applied physical force.

9. The method of claim 1, wherein providing a force to the ball valve comprises establishing a pressure above a threshold in the ball valve.

10. The method of claim 9, wherein the threshold is a pressure differential between the first location and the second location of about 10,000 psi.

11. The method of claim 1, further comprising providing a fluid to the second location after re-establishing fluid communication between the first location and the second location through the ball valve.

12. The method of claim 11, wherein the fluid comprises a kill fluid.

13. A ball within a ball valve comprising:
an interior fluid passage extending through the ball;
a first flow passage disposed in the ball that allows fluid communication between an exterior fluid and the interior fluid passage;
a second flow passage disposed in the ball that extends through a wall of the ball to the interior fluid passage; wherein the first flow passage and the second flow passage are on opposite hemispheres of the ball; and
a flow through device comprising:
    a plug disposed in the second flow passage and configured to sealingly engage the ball; and
    a shear device configured to engage the plug and retain the plug in the second flow passage, wherein the shear device comprises a shear ring, a shear pin or a shear screw.

14. The ball of claim 1, wherein at least a portion of the plug comprises an expanded cross section configured to prevent the plug from passing through the second flow passage into the interior flow passage.

15. A ball within a ball valve comprising:
an interior fluid passage extending through the ball;
a first flow passage disposed in the ball that allows fluid communication between an exterior fluid and the interior fluid passage;
a second flow passage disposed in the ball that extends through a wall of the ball to the interior fluid passage; wherein the first flow passage and the second flow passage are on opposite hemispheres of the ball; and
a flow through device comprising:
    a plug disposed in the second flow passage and configured to sealingly engage the ball; and
    a shear device configured to engage the plug and retain the plug in the second flow passage, and
further comprising a shear device retainer coupled to the plug.

16. The ball of claim 15, wherein a portion of the shear device is disposed between the shear device retainer and the plug.

17. The ball of claim 15, wherein at least a portion of the plug comprises an expanded cross section configured to prevent the plug from passing through the second flow passage into the interior flow passage.

18. A ball valve comprising:
a housing;
a ball rotatably disposed within the housing;
an interior fluid passage extending through the ball;
a first flow passage disposed in the ball that allows fluid communication between an exterior fluid and the interior fluid passage;
a second flow passage disposed in the ball that extends through a wall of the ball to the interior fluid passage; wherein the first flow passage and the second flow passage are on opposite hemispheres of the ball; and
a flow through device comprising:
    a plug configured to sealingly engage the ball when the plug is disposed in the first flow passage or the second flow passage, wherein at least a portion of the plug comprises an expanded cross section configured to prevent the plug from passing through the ball to the interior flow passage; and
    a shear device configured to engage the plug and retain the plug in sealing engagement with the ball.

19. The ball valve of claim 18, further comprising a shear device retainer coupled to the plug.

20. The ball valve of claim 18, further comprising a wellbore tubular coupled to the ball valve.

* * * * *